United States Patent [19]
Sink

[11] Patent Number: 5,394,807
[45] Date of Patent: Mar. 7, 1995

[54] POWER DRIVE SYSTEM

[75] Inventor: John D. Sink, Yorba Linda, Calif.

[73] Assignee: MagneTek Power Technology Systems, Inc., Anaheim, Calif.

[21] Appl. No.: 223,728

[22] Filed: Apr. 6, 1994

[51] Int. Cl.[6] .............................................. H02K 41/00
[52] U.S. Cl. ................................... 104/292; 104/281; 104/294; 318/135
[58] Field of Search ............... 104/281, 282, 286, 292, 104/290, 294; 318/135; 310/12

[56] References Cited

U.S. PATENT DOCUMENTS

| | | | |
|---|---|---|---|
| 4,303,870 | 12/1981 | Nakamura et al. | 104/292 |
| 4,348,618 | 9/1982 | Nakamura et al. | 104/290 |
| 4,454,457 | 6/1984 | Nakamura et al. | 104/292 |
| 5,237,252 | 8/1993 | Tanaka et al. | 104/290 |

FOREIGN PATENT DOCUMENTS

| | | | |
|---|---|---|---|
| 144703 | 6/1988 | Japan | 104/290 |
| 260613 | 10/1993 | Japan | 104/285 |

OTHER PUBLICATIONS

Cope and Chambers, "Power Transfer to Transfer to High Speed Vehicles", U.S. Department of Transportation, Federal Railroad Administration, National Maglev Initiative, Jul. 1992.

Thornton, Perreault, and Clark, "Linear Synchronous Motors for Maglev", U.S. Department of Transporation, Federal Railroad Administration, National Maglev Initiative, Jan. 1993.

Raposa, "Assessment of the Power Electronics for the Locally Commutated Linear Synchronous Motor (LCLSM)", U.S. Department of Transportation, Federal Railroad Administration, National Maglev Initiative, Feb. 1993 Final Report.

Primary Examiner—Mark T. Le
Attorney, Agent, or Firm—Faegre & Benson

[57] ABSTRACT

A power drive system for use in a linear motor propulsion system for powering and propelling a train of a predetermined length along a track. The power drive system includes a plurality of drive coils spaced along the track electrically connected together to form a set of coils. The distance along the track between adjacent coils in a set is greater than the train length. A plurality of sets of coils are interdigitated with each other, with the distance between adjacent coils from different sets spaced closely together to provide that a group of coils, each from different sets is adjacent the train at all locations along the track. The drive system also includes a plurality of inverters, each inverter connected to a set of coils.

12 Claims, 4 Drawing Sheets

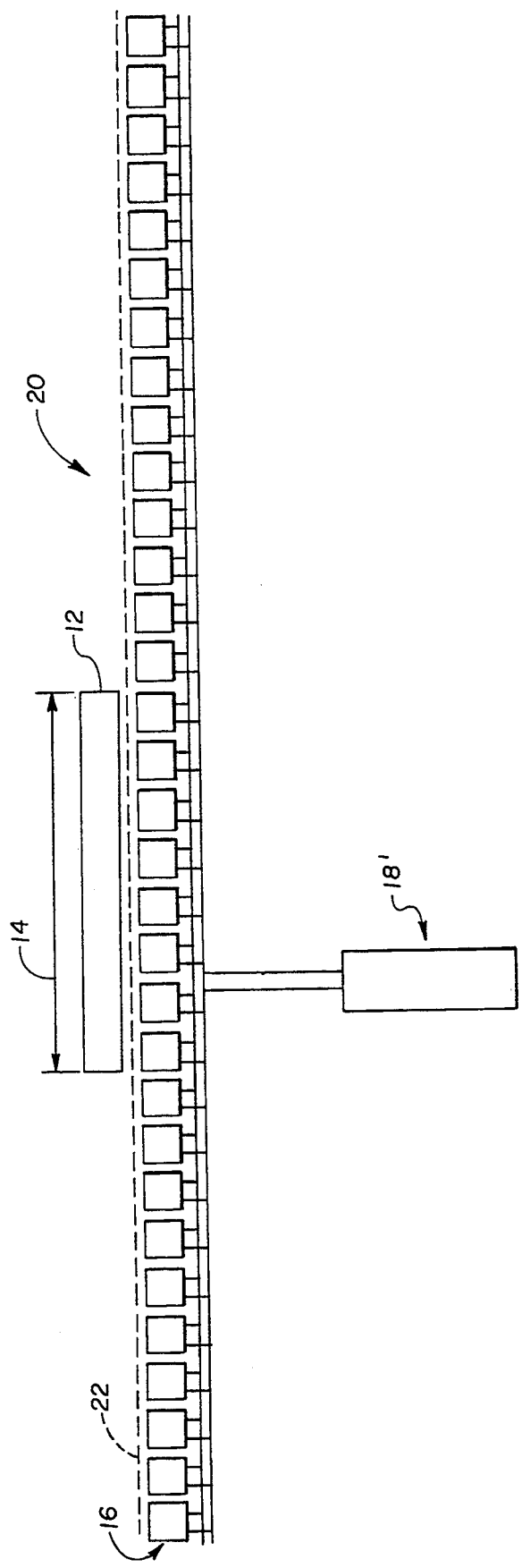

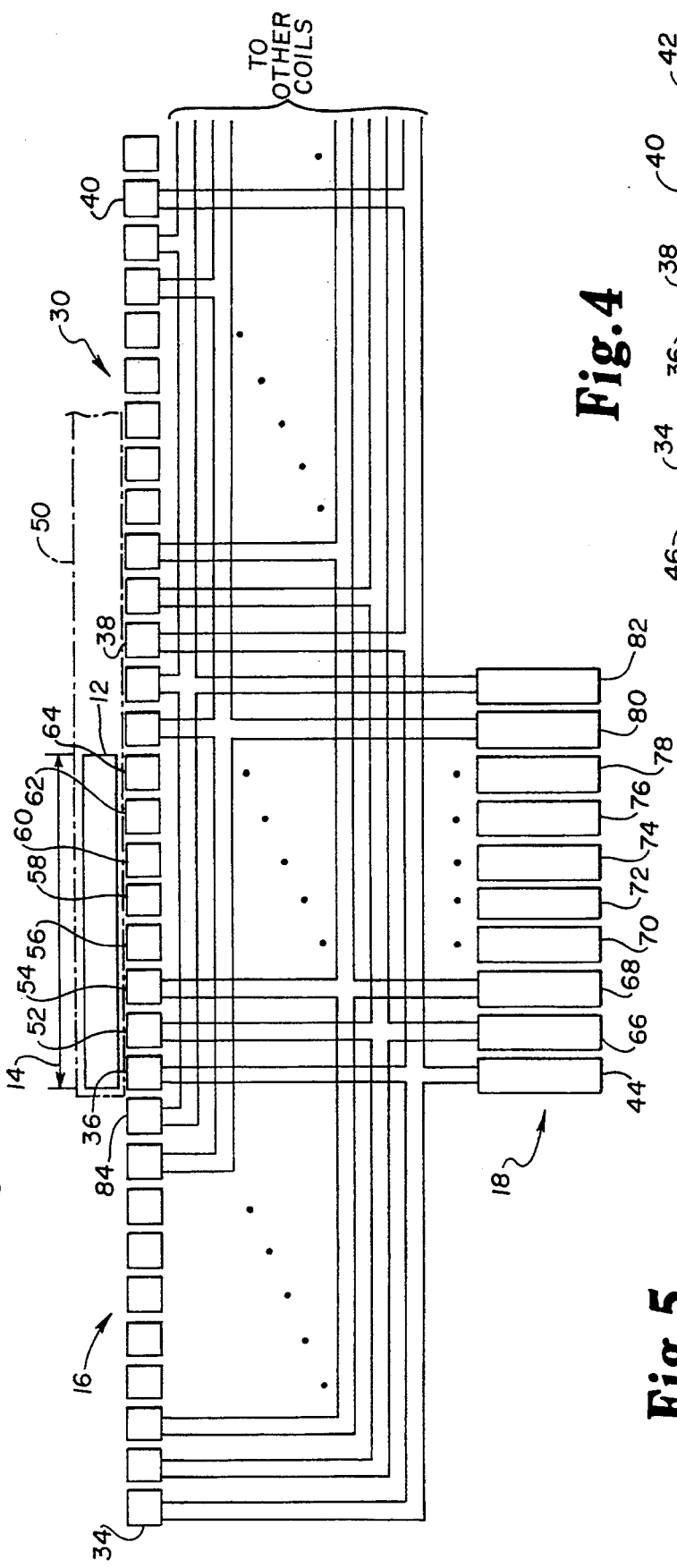
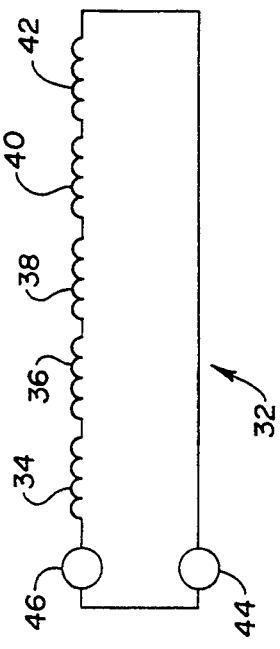
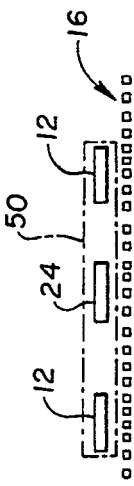

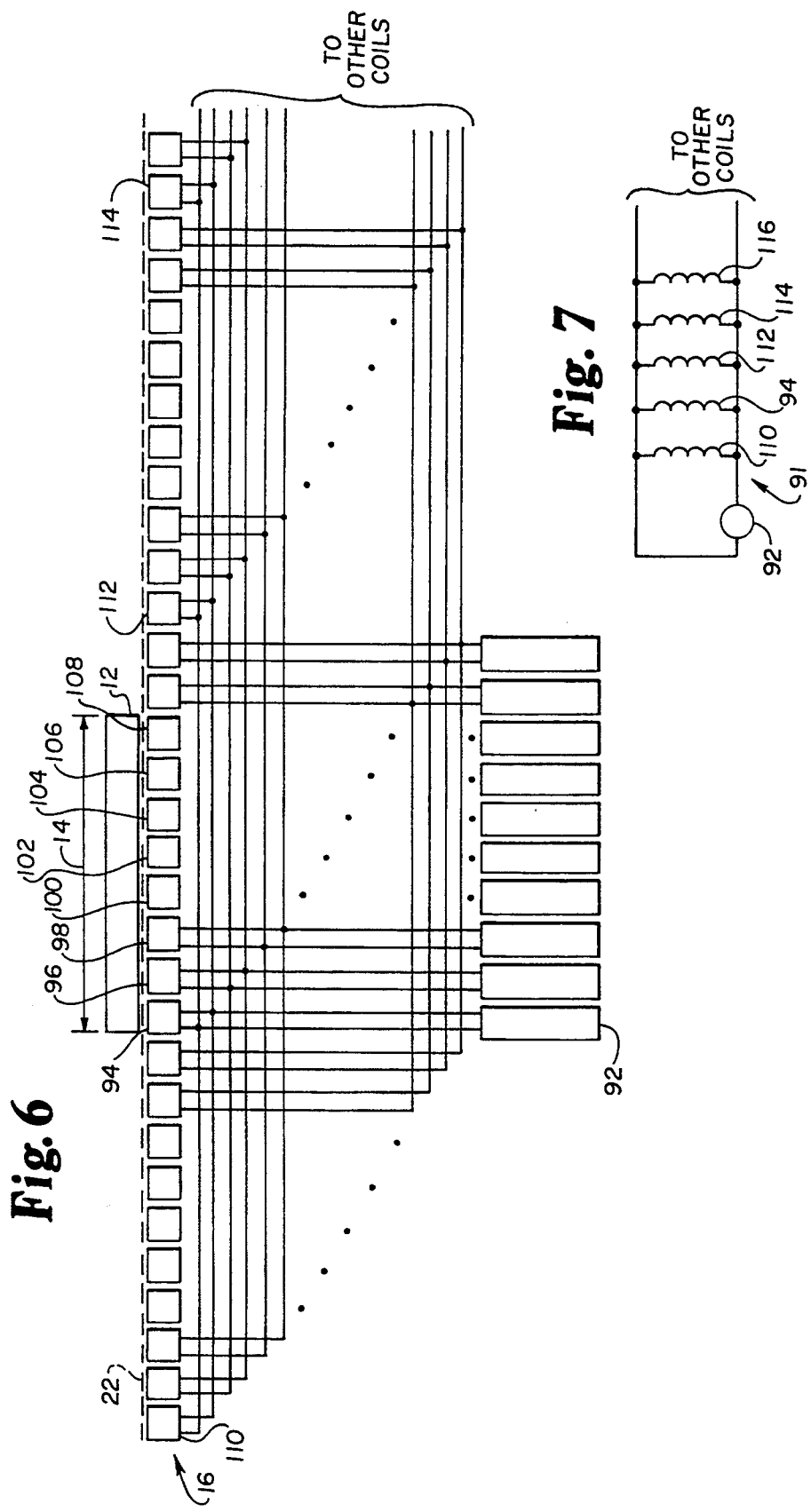

POWER DRIVE SYSTEM

BACKGROUND OF THE INVENTION

The present invention relates to an arrangement for powering linear motors applied particularly to magnetic levitation (MAGLEV) in railway transportation. One prior art approach to powering such railway systems included using one inverter per coil as shown in simplified form in FIG. 1. Such a system is relatively costly in that it requires a large number of relatively expensive inverters. In another prior art system, all the coils were connected in parallel and powered by a single inverter, as shown in FIG. 2. In such a parallel-driven system, a failure in the power drive electronics could incapacitate the entire track system. Even if the parallel system were broken up into segments or "blocks" the failure of an inverter would interrupt service because of the downtime of the affected block.

The present invention eliminates these shortcomings of the prior art by providing an arrangement for the inverter coils which reduces the number of inverters as compared to the inverter/coil system shown in FIG. 1, and provides for continuation of service even in the face of one or more inverter failures in contrast to the system shown in FIG. 2.

BRIEF DESCRIPTION OF THE DRAWINGS

FIG. 2 is a simplified drawing showing a MAGLEV train magnet assembly and its relationship to a prior art propulsion inverter and coil system having one inverter for the entire track system, with the coils connected in parallel.

FIG. 3 is a simplified drawing showing a magnet assembly and a portion of the associated MAGLEV train in relationship to one embodiment of the propulsion inverter and coil arrangement useful in the practice of the present invention.

FIG. 4 is a simplified schematic of an electrical circuit for one inverter and its associated coils for the arrangement shown in FIG. 3.

FIG. 5 is a simplified view of the MAGLEV train and magnet assemblies of FIG. 3.

FIG. 6 is a simplified drawing showing a magnet assembly of a MAGLEV train in relationship to an alternative embodiment of the propulsion inverter and coil arrangement useful in the practice of the present invention.

FIG. 7 is a simplified schematic of an electrical circuit for one inverter and its associated coils for the arrangement shown in FIG. 6.

DETAILED DESCRIPTION OF THE INVENTION

Figure 1:
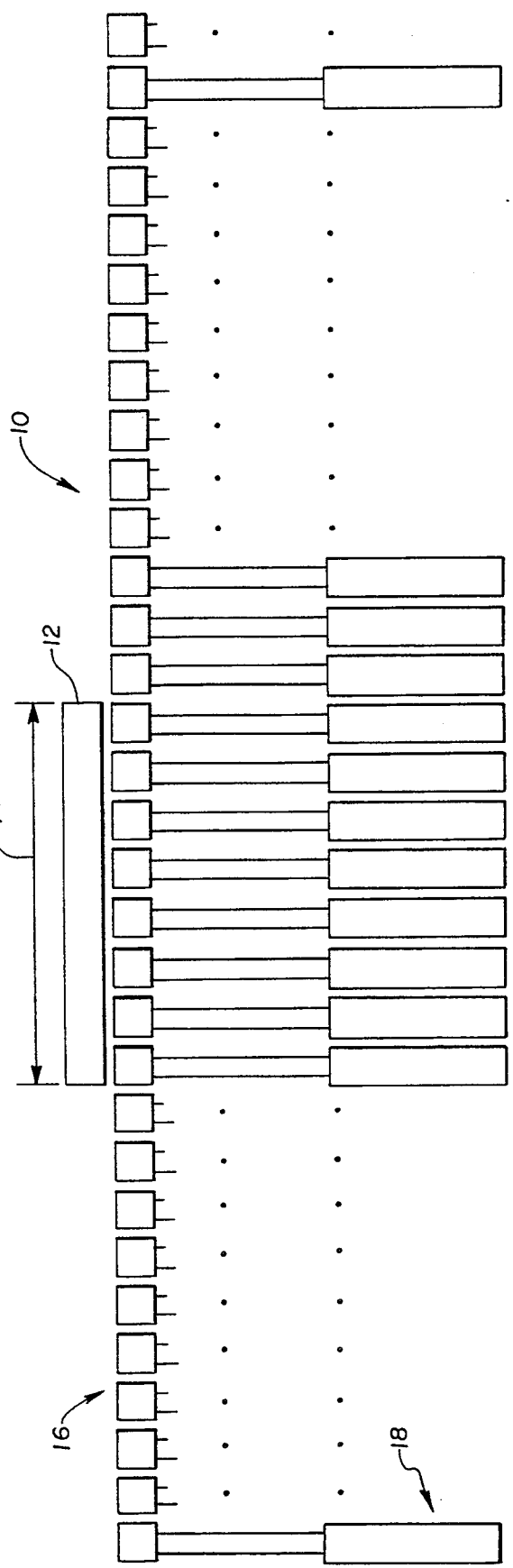
FIG. 1 is a simplified drawing showing a MAGLEV train magnet assembly and its relationship to a prior art propulsion inverter and coil system having one inverter per coil.

Referring now to the Figures and most particularly to FIG. 1, a prior art inverter per coil drive arrangement 10 may be seen. In FIG. 1, a MAGLEV train magnet assembly 12 has a length 14. A plurality of propulsion coils 16 are spaced apart along the track or right-of-way and each coil is powered by a separate inverter 18. While such an arrangement provides great flexibility in operating the inverters, it is relatively costly in that a very large number of inverters are employed. It is to be understood that the representation of certain of the inverters 18 and the interconnections between them and the coils 16 have been omitted and replaced by dots in FIG. 1, for simplicity.

In the inverter per coil arrangement 10 of FIG. 1 each drive coil 16 has an inverter 18 associated with it. Each inverter 18 provides about 1/N of the propulsion power for the train 12 where N is the number of coils in the group adjacent the train magnet assembly 12. For the example shown, N equals eight. In this arrangement, power transfer to the train 12 is provided from the same inverters 18 and coils 16 used for propulsion. For a two kilometer block of right-of-way, two to three thousand inverters are needed for this arrangement.

Referring now to FIG. 2, a prior art parallel-driven arrangement 20 may be seen. It is to be understood that in the system or arrangement 20, the coils are preferably ferrously coupled, indicated by dashed line 22, and the system is driven in parallel by a single inverter 18'. This arrangement 20 may be used to power the entire right-of-way or a "block" or segment of the right-of-way. This arrangement 20 has all the coils 16 in the system or block connected in parallel. If the inverter 18' fails, the entire system or block will be out of service, preventing movement of train 12.

Referring now to FIG. 3, a first embodiment of an interleaved coil and inverter arrangement 30 useful in the practice of the present invention may be seen. It is to be understood that in the arrangement 30, each inverter 18 is connected to a circuit or "set" of a predetermined plurality of coils, and the spacing of electrically adjacent coils in the set is greater than a predetermined length 14 of the train or vehicle 12. More specifically, it is to be understood that the predetermined length 14 is the length of the magnetic structure in the train 12, and the train (which is typically one car and is shown by chain line 50) may have, and preferably does have, more than one magnetic structure 12. In particular, and as shown in FIG. 5, it is preferable that train 50 have at least two magnetic structures 12 for propulsion, with one at each end of the train or car 50 and at least one power transfer assembly 24 (such as an air-core transformer or other suitable apparatus) in the middle of the train 50 for power transfer from coils 16 in the right-of-way to train 50.

FIG. 4 shows a circuit 32 of five coils corresponding to one circuit or set of coils shown in relationship to other sets and to the train 50 in FIG. 3. In circuit 32, coils 34, 36, 38 and 40 are also shown in FIG. 3; it is to be understood that the fifth coil 42 is not shown in FIG. 3 and that more than five coils may be included in circuit 32, if desired. Circuit 32 also includes an inverter 44, which is one of the inverters 18 of FIG. 3. The back EMF present in circuit 32 associated with the coil from set 32 in a "group" of coils adjacent magnet assembly 12 is indicated by element 46. As can be seen from FIG. 3, as the train 50 moves along the right-of-way, magnet assembly 12 will be adjacent a group of coils, with each coil in the group electrically connected to a separate set of coils from all the other coils in the group adjacent the magnet assembly 12. It will be further apparent that the composition of the coils in the group will change as the train 50 moves along the right-of-way, but with the arrangement of coils and inverters according to the present invention, any group thus formed will always be made up of only one coil from each set represented in the group, since the coils in each set are physically spaced a distance apart greater than length 14.

It is to be understood that each of coils 16 is connected in a similar manner to respective inverters 18 in the interleaved or interdigitated arrangement 30 of FIG. 3 and that certain of the connections have been omitted and replaced by dots, again for simplicity.

The interdigitated arrangement 30 of coils 16 from separate sets enables the inverters 18 to be used more than once as the train 12 moves along the right-of-way. This permits a substantial reduction in the cost of the power electronics, especially as compared to the arrangement 10 of FIG. 1. A failure of one inverter 18 in the arrangement 30 of FIG. 3 will remove power to only one coil adjacent the train 12 at any given time or location along the right-of-way, in contrast to a total loss of power to the system (or to a major part of the system longer than a length 14 of the train 12) when the arrangement 20 of FIG. 2 is used.

It is to be understood that in the practice of the present invention according to the embodiment shown in FIG. 3, coils 16 are preferably air-core drive motor coils, connected together electrically in series with the individual coils electrically adjacent in each set (e.g., coils 34 and 36 in set 32) spaced apart along the right-of-way by a distance greater than one train length 14. It is also to be understood that the inductance needed to filter a pulse width modulated (PWM) carrier frequency for this arrangement is two orders of magnitude greater than the frequency used for propulsion. Considerably more inductance than the inductance of a single propulsion coil is needed to filter the PWM carrier ripple current and the multiple coils in each set achieve this end.

In the practice of the present invention, it is to be understood that fifty or more inverters are to be used for a two kilometer block of right-of-way, or "guideway." It is to be further understood that in the arrangement 30 of FIG. 3, the inverters 18 and coils 16 provide both propulsion and power transfer to the train 12. In any given position along the right of way, when the train 12 is positioned adjacent a group of coils (for example, the group of coils 36, 52, 54, 56, 58, 60, 62, and 64 positioned adjacent the front end magnetic assembly 12 as shown in FIG. 3), the inverters and coils at the ends of the train provide propulsion drive and the inverters and coils adjacent the center of the train provide power transfer to the train. Propulsion frequency is low and power transfer frequency is high. Each of the coils 16 in the group adjacent the magnetic assembly 12 at any one time has to be driven separately to meet these conditions, and the arrangement 30 of FIG. 3 is especially adapted to meet these requirements. Furthermore, it is preferable to space the coils 16 apart by a length greater than the train 50 to reduce the electrical requirements of the inverters necessary to power coils 16. If the train has two or more magnet assemblies 12 and the coils were to be spaced closer together than the length of the train 50 carrying at least two magnet assemblies 12, the inverters 18 could be required to operate at two voltage levels, with one level present when only one coil in a set is adjacent a magnet assembly and the other level present when two coils in a set are simultaneously adjacent magnet assemblies in train. In the practice of the present invention, it is believed preferable to use an arrangement resulting in only one voltage level; in accord with this principle, it is to be understood that, as used herein, "magnet assembly" can mean either one magnet assembly 12 as shown in FIG. 3, or it can mean the "magnet assembly" of a train, extending from the leading edge of the magnet assembly in the front of the train to the trailing edge of the magnet assembly at the back of the train.

In operation, once the train 50 leaves the position shown in FIG. 3 (moving to the left) magnetic assembly 12 will become adjacent coil 84 (powered by inverter 82) and at the same time the magnetic assembly 12 will no longer be adjacent coil 64 (powered by inverter 78). The group of coils adjacent assembly 12 will then be made of coils 84, 36, 52, 54, 56, 58, 60, and 62. It is to be noted that at any given time, each of the coils making up a group adjacent a magnetic assembly will be from a separate set of coils, with the same number of coils in the group as the number of sets making up the group. In other words, the group of coils is the collection of coils adjacent a magnetic structure at a given time and the individual coils (and sets) making up a group will change as the train moves.

Referring now to FIGS. 6 and 7, an alternative embodiment for a coil and inverter arrangement 90 useful in the practice of the present invention may be seen. In this embodiment the coils 16 are interdigitated and the coils forming a group adjacent the magnet assembly 12 are again taken from separate sets. This embodiment shows the coils in each set connected in parallel, as can be most clearly seen in FIG. 7, which shows a set 91 of coils 110, 94, 112, 314, 116 together with its respective inverter 92. Coils 94, 96, 98, 100, 102, 104, 106 and 108 together make up a "group" adjacent magnet structure 12, spanning the length 14 at the time the magnetic structure 12 is in the position shown in FIG. 6. Again the group is made up of a plurality of coils, with only one coil from any given set in the group, and with the coils (in this embodiment) connected in their respective set in parallel with each other. In this embodiment, an iron-core arrangement for coils 16 is used, indicated by dashed line 22. It is to be understood that it is within the scope of this invention to have other electrical connections between the coils in a set, provided that the coils from separate sets are relatively closely interdigitated to form a group and the coils in a given set are spaced relatively far apart, at least by a distance greater than the predetermined length of the train, or more specifically the magnetic structure carried by the train.

The invention is not to be taken as limited to all of the details thereof as modifications and variations thereof may be made without departing from the spirit or scope of the invention.

What is claimed is:

1. A linear motor propulsion system for powering and propelling a MAGLEV train of a predetermined length along a track, the power drive system comprising;
   a plurality of sets of drive coils located at spaced locations along the length of the track, wherein each set is formed of a predetermined number of coils electrically connected to each other and wherein each coil in a set has a length substantially shorter than the predetermined length and is spaced a distance greater than the predetermined length apart from each other coil in that set; and
   a plurality of inverters, each inverter connected to a set of coils,
   wherein coils from different sets are interdigitated with each other such that a group of coils from separate sets are adjacent the train at all times as it moves along the track with only one coil from any set in the group at a time.

2. The power drive system of claim 1 wherein the sets of coils are electrically independent of each other 3. The power drive system of claim 1 wherein the drive coils of the power drive system are air-core drive coils.

4. The power drive system of claim 1 wherein the coils in a set are electrically connected in series with each other and with the inverter of that set.

5. The power drive system of claim 1 wherein the coils in a set are electrically connected in parallel with each other and with the inverter of that set.

6. A power drive system for use in a linear motor propulsion system for powering a vehicle on a track comprising:
   a magnet assembly comprising a plurality of magnets located on the vehicle, the magnet assembly having a predetermined length;
   a plurality of sets of coils, with each set formed of a plurality of coils electrically connected together and located along the track with adjacent coils in the set spaced apart a distance greater than the predetermined length and wherein each coil has a length substantially shorter than the predetermined length; and wherein coils from separate sets are interdigitated to form a group of coils spaced to be adjacent at all times to the magnet assembly as the vehicle moves along the track; and
   a plurality of inverters, each inverter connected to a separate set of coils.

7. The power drive system of claim 6 wherein the coils are aircore coils.

8. A power drive system for use in a linear motor propulsion system for powering and propelling a magnetic levitation train having a magnetic structure of a predetermined length in a track, the power drive system comprising;
   a plurality of sets of coils, wherein each set has a plurality of coils electrically connected together along the track, wherein the physical distance between electrically adjacent coils is greater than the predetermined length of the magnetic structure and wherein each coil has a length substantially shorter than the predetermined length; and
   a plurality of inverters, each inverter connected to a set of coils;
   wherein the coils from different sets are interdigitated with each other such that a group of coils made up of individual coils from a predetermined number of sets is adjacent at all times to the magnetic structure of the train regardless of where the train is located along the track.

9. The power drive system of claim 8 wherein the train has at least two magnetic structures, with one magnetic structure at each end of the train.

10. The power drive system of claim 9 further comprising a power transfer structure intermediate the two magnetic structures.

11. The power drive system of claim 10 wherein the groups of coils located adjacent the magnetic structures at the ends of the train propel the train and the group of coils located adjacent the power transfer structure provides power to the train.

12. The power drive system of claim 8 wherein the coils forming the group change as the train moves along the track.

* * * * *

UNITED STATES PATENT AND TRADEMARK OFFICE
CERTIFICATE OF CORRECTION

PATENT NO. : 5,394,807
DATED : March 7, 1995
INVENTOR(S) : John D. Sink

It is certified that error appears in the above-indentified patent and that said Letters Patent is hereby corrected as shown below:

Column 4, line 27, "314" should be --114--.

Signed and Sealed this

Sixth Day of June, 1995

BRUCE LEHMAN

*Attest:*

*Attesting Officer*    *Commissioner of Patents and Trademarks*